(12) United States Patent
Scott et al.

(10) Patent No.: US 9,982,567 B2
(45) Date of Patent: May 29, 2018

(54) GAS TURBINE ENGINE MID-TURBINE FRAME TIE ROD ARRANGEMENT

(71) Applicant: United Technologies Corporation, Farmington, CT (US)

(72) Inventors: Jonathan Ariel Scott, Southington, CT (US); Steven J. Bauer, East Haddam, CT (US)

(73) Assignee: United Technologies Corporation, Farmington, CT (US)

( * ) Notice: Subject to any disclaimer, the term of this patent is extended or adjusted under 35 U.S.C. 154(b) by 497 days.

(21) Appl. No.: 14/958,984

(22) Filed: Dec. 4, 2015

(65) Prior Publication Data

US 2016/0169050 A1    Jun. 16, 2016

Related U.S. Application Data

(60) Provisional application No. 62/092,429, filed on Dec. 16, 2014.

(51) Int. Cl.
| | | |
|---|---|---|
| *F01D 25/08* | (2006.01) | |
| *F01D 25/28* | (2006.01) | |
| *F02C 7/20* | (2006.01) | |
| *F01D 9/06* | (2006.01) | |

(52) U.S. Cl.
CPC ............ *F01D 25/28* (2013.01); *F01D 9/065* (2013.01); *F02C 7/20* (2013.01); *F05D 2220/32* (2013.01); *F05D 2260/31* (2013.01)

(58) Field of Classification Search
CPC ........ F01D 25/28; F01D 25/162; F01D 9/065; F01D 5/02; F02C 7/20; F05D 2260/31; F05D 2220/32; F16B 39/24
See application file for complete search history.

(56) References Cited

U.S. PATENT DOCUMENTS

| | | | | |
|---|---|---|---|---|
| 1,543,282 A | * | 6/1925 | De Loe | ................... F16B 39/24 |
| | | | | 411/197 |
| 5,160,521 A | * | 11/1992 | Tran | .................. C03B 37/01268 |
| | | | | 65/130 |
| 5,938,173 A | * | 8/1999 | Hayakawa | ............ F16K 5/0694 |
| | | | | 251/214 |
| 2013/0192235 A1 | | 8/2013 | Sanchez et al. | |
| 2013/0192261 A1 | | 8/2013 | Mayer et al. | |
| 2013/0224010 A1 | | 8/2013 | Farah et al. | |

(Continued)

FOREIGN PATENT DOCUMENTS

| | | |
|---|---|---|
| EP | 1719877 | 11/2006 |
| WO | 2013067361 | 5/2013 |
| WO | 20140137574 | 9/2014 |

OTHER PUBLICATIONS

The Extended European Search Report for EP Application No. 15200129.3, dated May 18, 2016.

*Primary Examiner* — Woody Lee, Jr.
*Assistant Examiner* — Maxime Adjagbe
(74) *Attorney, Agent, or Firm* — Carlson, Gaskey & Olds, P.C.

(57) ABSTRACT

A gas turbine engine mid-turbine frame includes an annular case that has a hole. A tie rod with a first end extends through the hole. The first end includes a threaded portion. A nut is secured to the threaded portion to clamp the tie rod to the annular case. A tab washer is arranged between the nut and the annular case. The tab washer interlocks the nut to the case to prevent relative rotation therebetween.

19 Claims, 6 Drawing Sheets

(56) References Cited

U.S. PATENT DOCUMENTS

| | | |
|---|---|---|
| 2014/0000284 A1 | 1/2014 | Scott |
| 2014/0003920 A1 | 1/2014 | Scott |
| 2014/0013770 A1 | 1/2014 | Farah et al. |
| 2014/0013771 A1 | 1/2014 | Farah et al. |
| 2014/0024128 A1 | 1/2014 | Frobert |
| 2014/0102110 A1 | 4/2014 | Farah et al. |
| 2014/0227078 A1 | 8/2014 | Chokshi |
| 2014/0245750 A1 | 9/2014 | Chuong et al. |

\* cited by examiner

GAS TURBINE ENGINE MID-TURBINE FRAME TIE ROD ARRANGEMENT

CROSS-REFERENCE TO RELATED APPLICATIONS

This application claims priority to U.S. Provisional Application No. 62/092,429, which was filed on Dec. 16, 2014 and is incorporated herein by reference.

BACKGROUND

This disclosure relates to a gas turbine engine mid-turbine frame tie rod arrangement.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A mid-turbine frame (MTF) is arranged axially between the high and low pressure turbines. One example MTF includes inner and outer cases secured to one another with tie rods extending radially between the cases. Airfoils are provided between the inner and outer cases, and the tie rods extend through some of the airfoils.

In one arrangement, opposing ends of the tie rod are threaded. Fasteners are secured to the threaded end to clamp the MTF assembly together. An anti-rotation feature may be provided at an inner end of the tie rod and the inner case. The feature prevents the rotation of the tie rod about its longitudinal axis thereby precluding interference with the airfoils, and loosening of a nut securing the rod to the inner case, during assembly of the MTF.

SUMMARY

In one exemplary embodiment, a gas turbine engine mid-turbine frame includes an annular case that has a hole. A tie rod with a first end extends through the hole. The first end includes a threaded portion. A nut is secured to the threaded portion to clamp the tie rod to the annular case. A tab washer is arranged between the nut and the annular case. The tab washer interlocks the nut to the case to prevent relative rotation therebetween.

In a further embodiment of the above, the annular case includes an outer diameter surface that has a pocket adjoining the hole. The first end provides circumferential opposing curved surfaces that engage correspondingly shaped surfaces of the pocket.

In a further embodiment of any of the above, the first end includes flats that are spaced apart a width. The flats adjoin the curved surfaces.

In a further embodiment of any of the above, the threaded portion includes a diameter that is greater than the width.

In a further embodiment of any of the above, the curved surfaces provide a square shoulder that abuts the annular case adjacent to the hole.

In a further embodiment of any of the above, the annular case includes an outer diameter surface and a wall that protrudes radially from the outer diameter surface. The first end includes a lip that extends radially from the first end relative to a longitudinal axis of the tie rod. The lip engages the wall.

In a further embodiment of any of the above, the lip includes a flat engaging the wall.

In a further embodiment of any of the above, the annular case includes a pair of spaced apart walls parallel to one another. The lip engages the walls.

In a further embodiment of any of the above, the lip is oval-shaped and circumscribes the first end.

In a further embodiment of any of the above, the annular case is an inner case and comprises an outer case and an airfoil that extends radially between the inner and outer cases. The tie rod extends through the airfoil. The tie rod includes a second end opposite the first end. A fastener is secured to the second end to clamp the airfoil between the inner and outer cases.

In another exemplary embodiment, a gas turbine engine mid-turbine frame includes an annular case that has a hole. The annular case includes an outer diameter surface and a wall that protrudes radially from the outer diameter surface. A tie rod with a first end extends through the hole. The first end includes a threaded portion and a lip that extends radially from the first end relative to a longitudinal axis of the tie rod. The lip engages the wall. A nut is secured to the threaded portion to clamp the tie rod to the annular case.

In a further embodiment of the above, the lip includes a flat engaging the wall.

In a further embodiment of any of the above, the annular case includes a pair of spaced apart walls parallel to one another. The lip engages the walls.

In a further embodiment of any of the above, the lip is oval-shaped and circumscribes the first end.

In a further embodiment of any of the above, a tab washer is arranged between the nut and the annular case. The tab washer interlocks the nut to the case to prevent relative rotation therebetween.

In another exemplary embodiment, a gas turbine engine mid-turbine frame includes an annular case that has a hole. The annular case includes an outer diameter surface that has a pocket adjoining the hole. A tie rod with a first end extends through the hole. The first end includes a threaded portion. The first end provides circumferential opposing curved surfaces that engage correspondingly shaped surfaces of the pocket. A nut is secured to the threaded portion to clamp the tie rod to the annular case.

In a further embodiment of any of the above, the first end includes flats spaced apart a width and the flats adjoin the curved surfaces.

In a further embodiment of any of the above, the threaded portion includes a diameter that is greater than the width.

In a further embodiment of any of the above, the curved surfaces provide a square shoulder that abuts the annular case adjacent to the hole.

In a further embodiment of any of the above, a tab washer is arranged between the nut and the annular case. The tab washer interlocks the nut to the case to prevent relative rotation therebetween.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
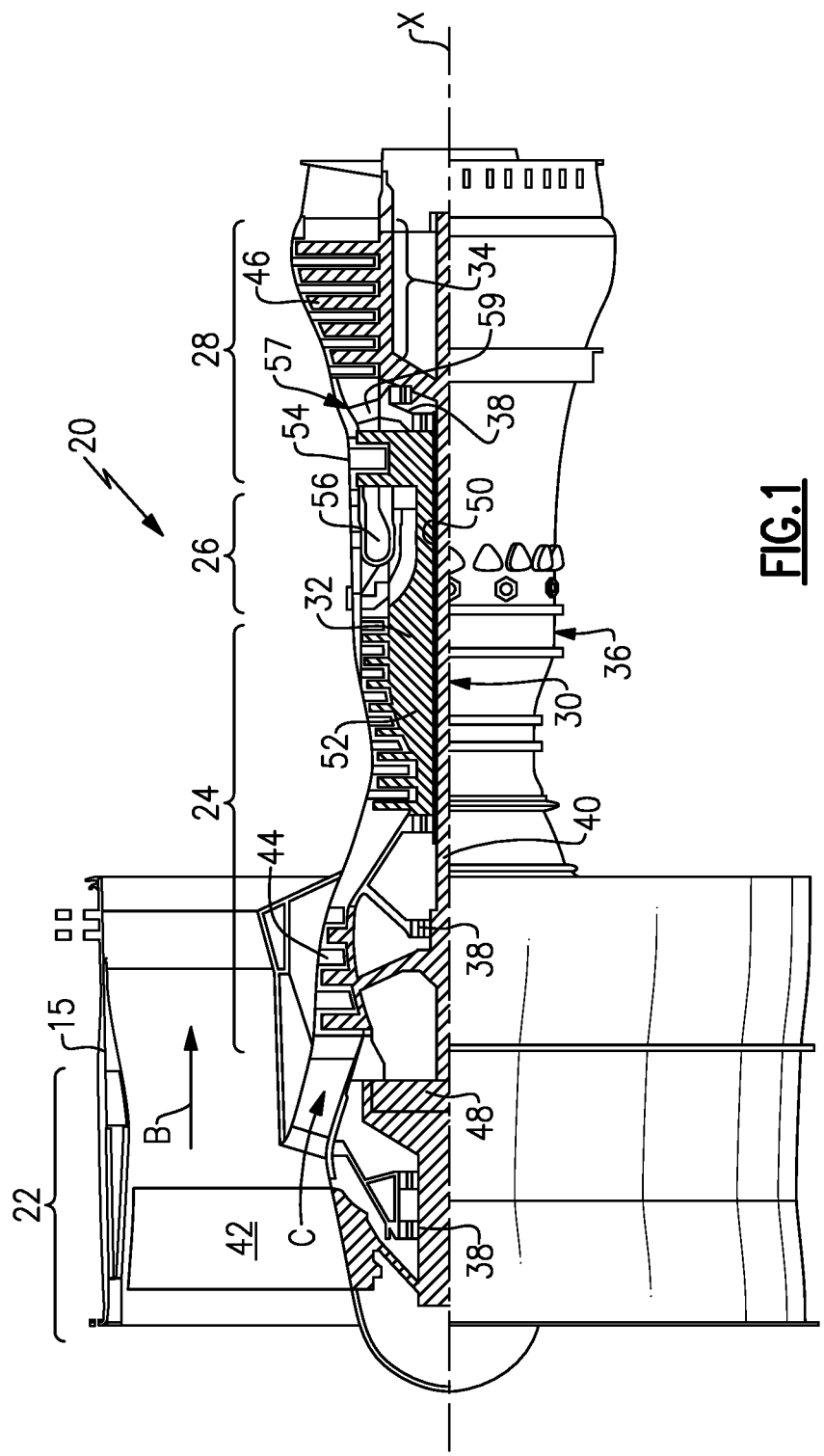
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. It should be understood that the mid-turbine frame can also be arranged between high pressure and intermediate pressure turbines and/or intermediate pressure and low pressure turbines in a three-spool configuration. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7 \ °R)]^{0.5}$. The "Low corrected fan tip speed" as disclosed herein according to one non-limiting embodiment is less than about 1150 ft/second (350.5 meters/second).

Figure 2:
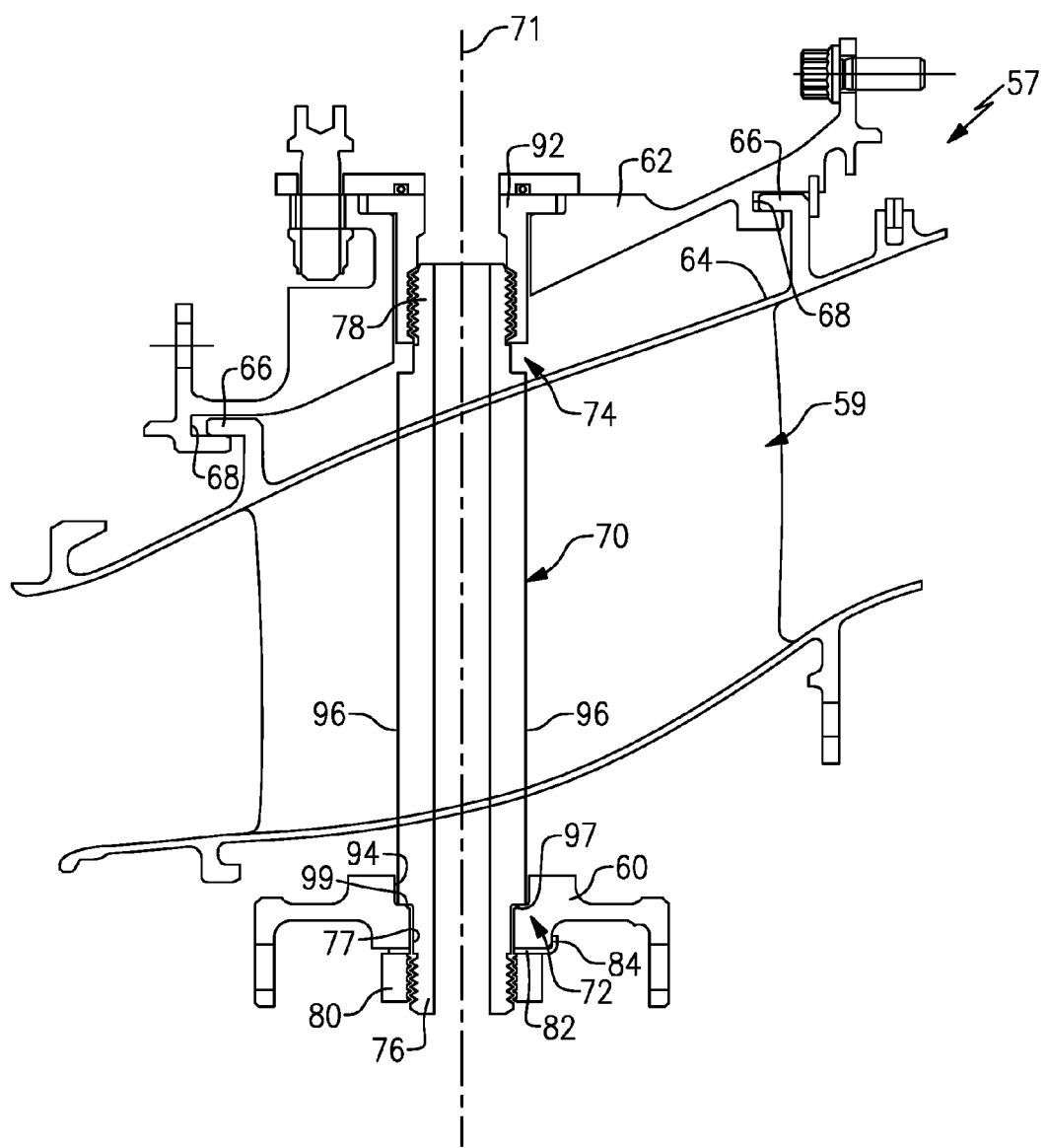
FIG. 2 is a cross-sectional view through one MTF.

One example of the mid-turbine frame (MTF) 57 is shown in more detail in FIG. 2. The MTF 57 includes annular cases, in the example an inner case 60 and an outer case 62, axially aligned with one another. An outer circumference 64 of the airfoils 59 include hooks 66 received in corresponding annular groove 68 of the outer case. A tie rod 70 extends radially along a longitudinal axis 71 between the inner and outer cases 60, 62 to form a rigid ring-strut-ring assembly with the inner and outer cases 60, 62. The airfoils 59 and tie rods 70 are arranged circumferentially about the inner case 60.

Figure 3A:
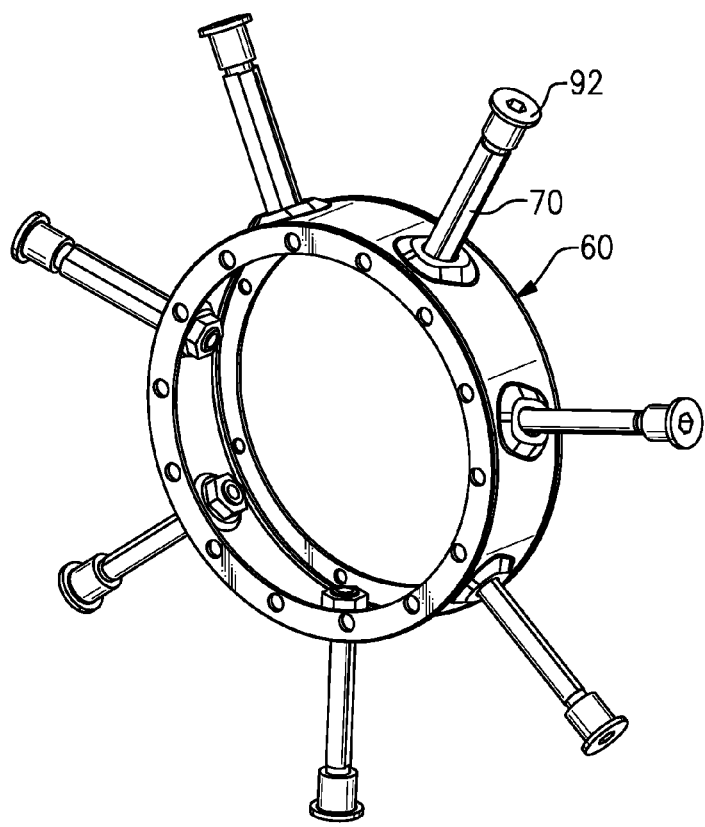
FIG. 3A a perspective view of an inner case of the MTF with multiple circumferentially spaced tie rods secured thereto.
Figure 3B:
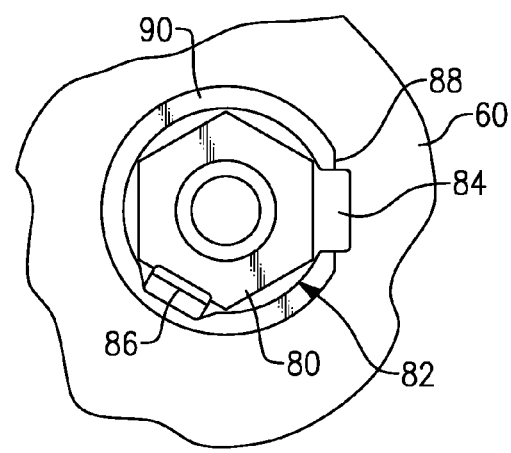
FIG. 3B is a plan view of a nut securing the first end of the tie rod to the inner case.
Figure 4:
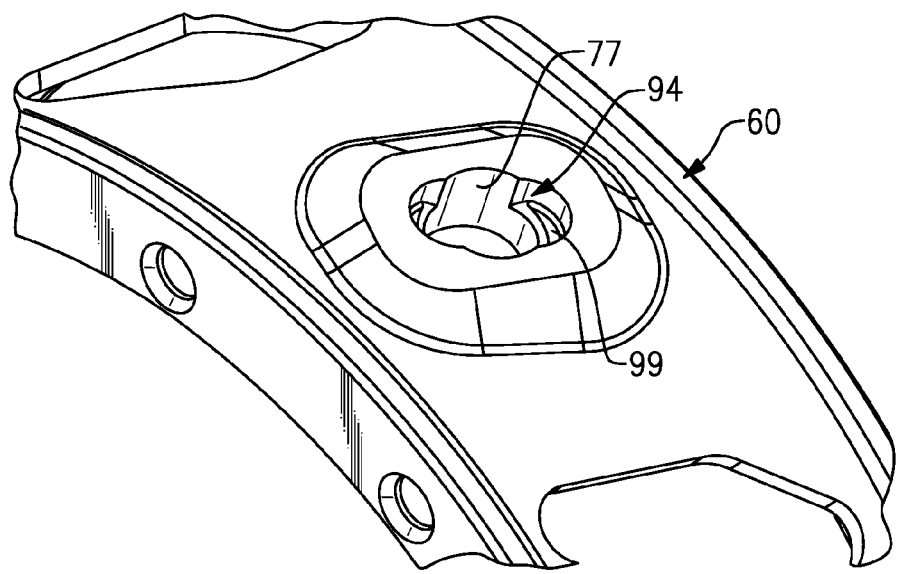
FIG. 4 is a perspective view of a portion of the inner case shown in FIGS. 2 and 3A.
Figure 5:
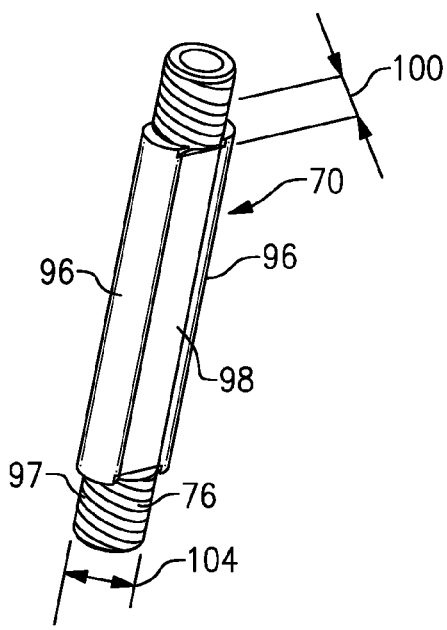
FIG. 5 is a perspective view of the tie rod shown in FIGS. 2 and 3A.

Each tie rod 70 includes first and second opposing ends 72, 74, which respectively include first and second threaded portions 76, 78. The first end 72 is received within a hole 77 of the inner case. A nut 80 is secured to the first threaded portion 76. A tab or key washer 82 is provided between the inner case 60 and the nut 80. Referring to FIG. 3B, the tab washer 82 includes a first tang 84 bent over a flat 88 provided on a boss 90 at an inner diameter of the inner case 60. Once the nut 80 has been tightened to the desired torque specification, a second tang 86 is bent to engage one of the flats on the nut 80 to interlock the nut 80 to the inner case and prevent relative rotation therebetween.

Referring to FIGS. 2, 3A, 4 and 5, a pocket 94 adjoins the hole 77. The tie rod 70 includes opposing curved surfaces 96 adjoined by flats 98 to provide an oval-shaped cross section. The flats 98 are spaced apart a width 100, and the first threaded portion 76 includes a diameter 104 that is larger than the width 100. The narrower unthreaded portion enables the tie rod 70 to be inserted into the cavity of the airfoil 59 during MTF assembly.

The curved surfaces 96 proved a shoulder 97 that abuts a surface 99 of the pocket 94. The contour of the first end 72 and the correspondingly shaped pocket 94 prevent rotation of the tie rod 70 relative to the inner case 60 as the nut 80 is tightened during assembly. The tab washer 82 with the first and second tangs 84, 86 prevent the nut 80 from backing off during MTF assembly and engine operation. For example, the tie rod 70 will not rotate and the nut 80 will not loosen when the fastener 92 is secured to the second threaded portion 78, as best appreciated with reference to FIGS. 2 and 3A.

Figure 6:
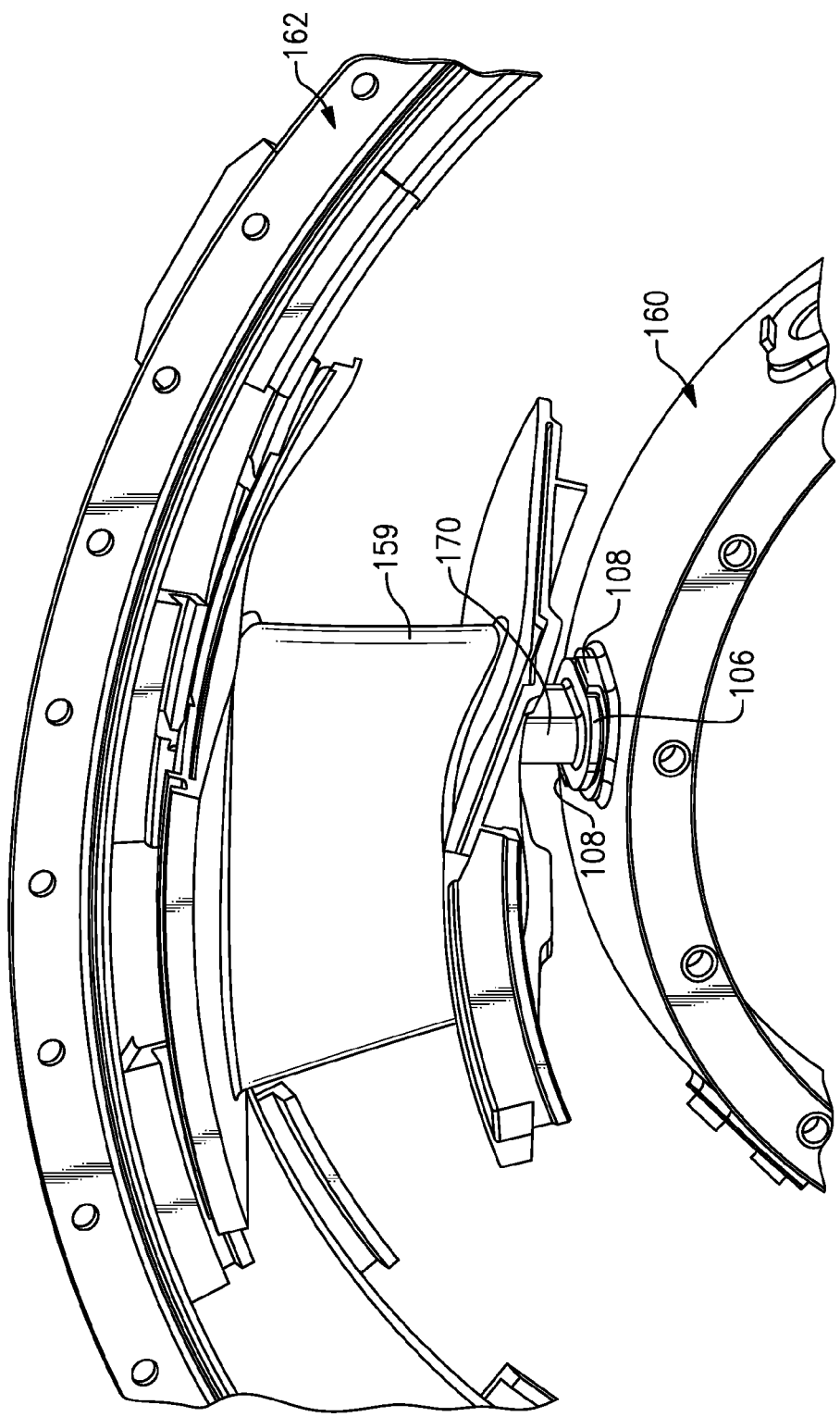
FIG. 6 is a partially exploded view of another MTF.
Figure 7:
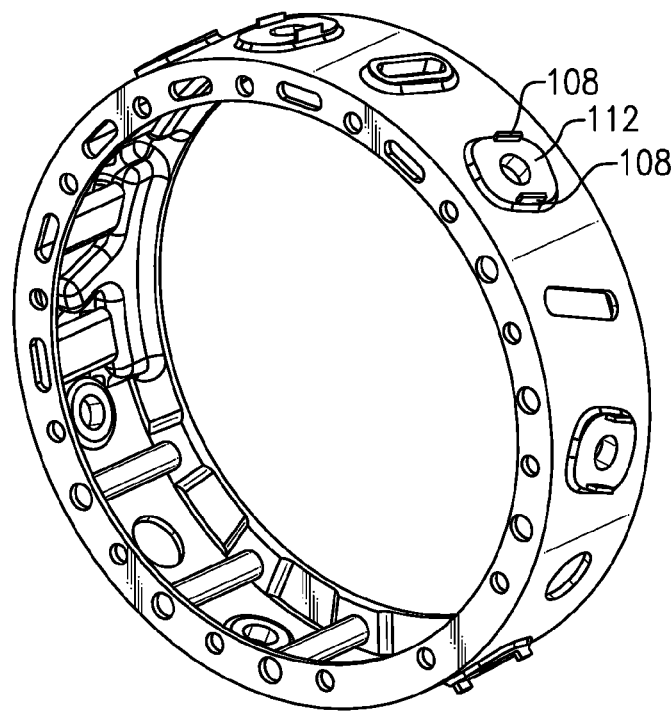
FIG. 7 is perspective view of another inner case.
Figure 8:
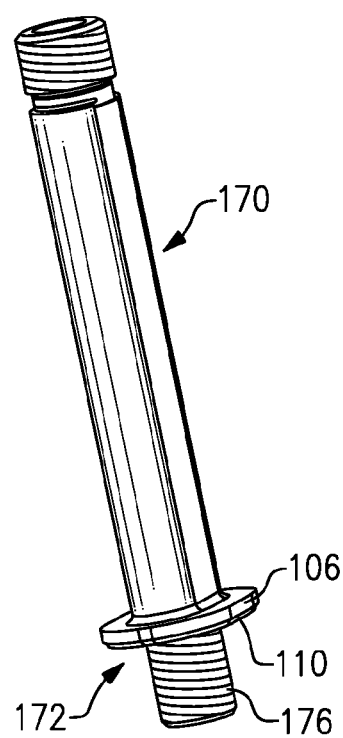
FIG. 8 is a perspective view of another tie rod.

Another tie rod arrangement is shown in FIGS. 6-8. The inner case 160 includes spaced apart, parallel walls 108 extending in a radial direction from an outer surface of the inner case 160. The tie rod 170 extends radially through the airfoil 159 and to the outer case 162.

The walls 108 adjoin a flat surface 112. A lip 106 circumscribes the tie rod 170 near the first threaded portion 176 to provide a shoulder 110 that abuts the surface 112. The lip 106 has an oval-shape with flats that correspondingly engage the walls 108.

The disclosed tie rod arrangement provides an anti-rotation feature with simplified machining operations that reduce the overall cost of the MTF. The tab washer 82 prevents loosening of the nut 80 during the assembly procedure as well as during engine operation.

It should also be understood that although a particular component arrangement is disclosed in the illustrated embodiment, other arrangements will benefit herefrom. For example, the disclosed arrangement can be used for a turbine exhaust case. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine mid-turbine frame comprising:
   an annular case that has a boss with a hole, the boss includes a flat;
   a tie rod with a first end extends through the hole, the first end includes a threaded portion;
   a nut is secured to the threaded portion to clamp the tie rod to the annular case; and
   a tab washer is arranged between the nut and the annular case, the tab washer has a first tang that engages the flat and a second tang that engages the nut to interlock the nut to the case and prevent relative rotation therebetween.

2. The mid-turbine frame according to claim 1, wherein the annular case includes an outer diameter surface that has a pocket adjoining the hole, the first end provides circumferential opposing curved surfaces engaging correspondingly shaped surfaces of the pocket.

3. The mid-turbine frame according to claim 2, wherein the first end includes flats spaced apart a width, the flats adjoin the curved surfaces.

4. The mid-turbine frame according to claim 3, wherein the threaded portion includes a diameter that is greater than the width.

5. The mid-turbine frame according to claim 4, wherein the curved surfaces provide a square shoulder that abuts the annular case adjacent to the hole.

6. The mid-turbine frame according to claim 1, wherein the annular case includes an outer diameter surface and a wall protruding radially from the outer diameter surface, the first end including a lip extending radially from the first end relative to a longitudinal axis of the tie rod, the lip engaging the wall.

7. The mid-turbine frame according to claim 6, wherein the lip includes a flat engaging the wall.

8. The mid-turbine frame according to claim 6, wherein the annular case includes a pair of spaced apart walls parallel to one another, the lip engaging the walls.

9. The mid-turbine frame according to claim 6, wherein the lip is oval-shaped and circumscribes the first end.

10. The mid-turbine frame according to claim 1, wherein the annular case is an inner case, and comprising an outer case and an airfoil extending radially between the inner and outer cases, the tie rod extending through the airfoil, and the tie rod includes a second end opposite the first end, a fastener secured to the second end to clamp the airfoil between the inner and outer cases.

11. A gas turbine engine mid-turbine frame comprising:
    an annular case that has a hole, the annular case includes an outer diameter surface and a wall protruding radially from the outer diameter surface;
    a tie rod with a first end extends through the hole, the first end includes a threaded portion, the first end including a lip extending radially from the first end relative to a longitudinal axis of the tie rod, the lip includes a flat at a circumferential extremity of the lip, the flat engaging the wall; and
    a nut is secured to the threaded portion to clamp the tie rod to the annular case.

12. The mid-turbine frame according to claim 11, wherein the annular case includes a pair of spaced apart walls parallel to one another, the lip engaging the walls.

13. The mid-turbine frame according to claim 11, wherein the lip is oval-shaped and circumscribes the first end.

14. The mid-turbine frame according to claim 11, comprising a tab washer arranged between the nut and the annular case, the tab washer interlocks the nut to the case to prevent relative rotation therebetween.

15. A gas turbine engine mid-turbine frame comprising:
   an annular case that has a hole, the annular case includes an outer diameter surface that has a pocket adjoining the hole;
   a tie rod with a first end extends through the hole, the first end includes a threaded portion, the first end provides circumferentially opposing curved surfaces and a flat engaging correspondingly shaped surfaces of and seated within the pocket; and
   a nut is secured to the threaded portion to clamp the tie rod to the annular case.

16. The mid-turbine frame according to claim 15, wherein the first end includes a pair of flats spaced apart a width, the pair of flats adjoin the curved surfaces.

17. The mid-turbine frame according to claim 16, wherein the threaded portion includes a diameter that is greater than the width.

18. The mid-turbine frame according to claim 17, wherein the curved surfaces provide a square shoulder that abuts the annular case adjacent to the hole.

19. The mid-turbine frame according to claim 15, comprising a tab washer arranged between the nut and the annular case, the tab washer interlocks the nut to the case to prevent relative rotation therebetween.

* * * * *